Figure 1:
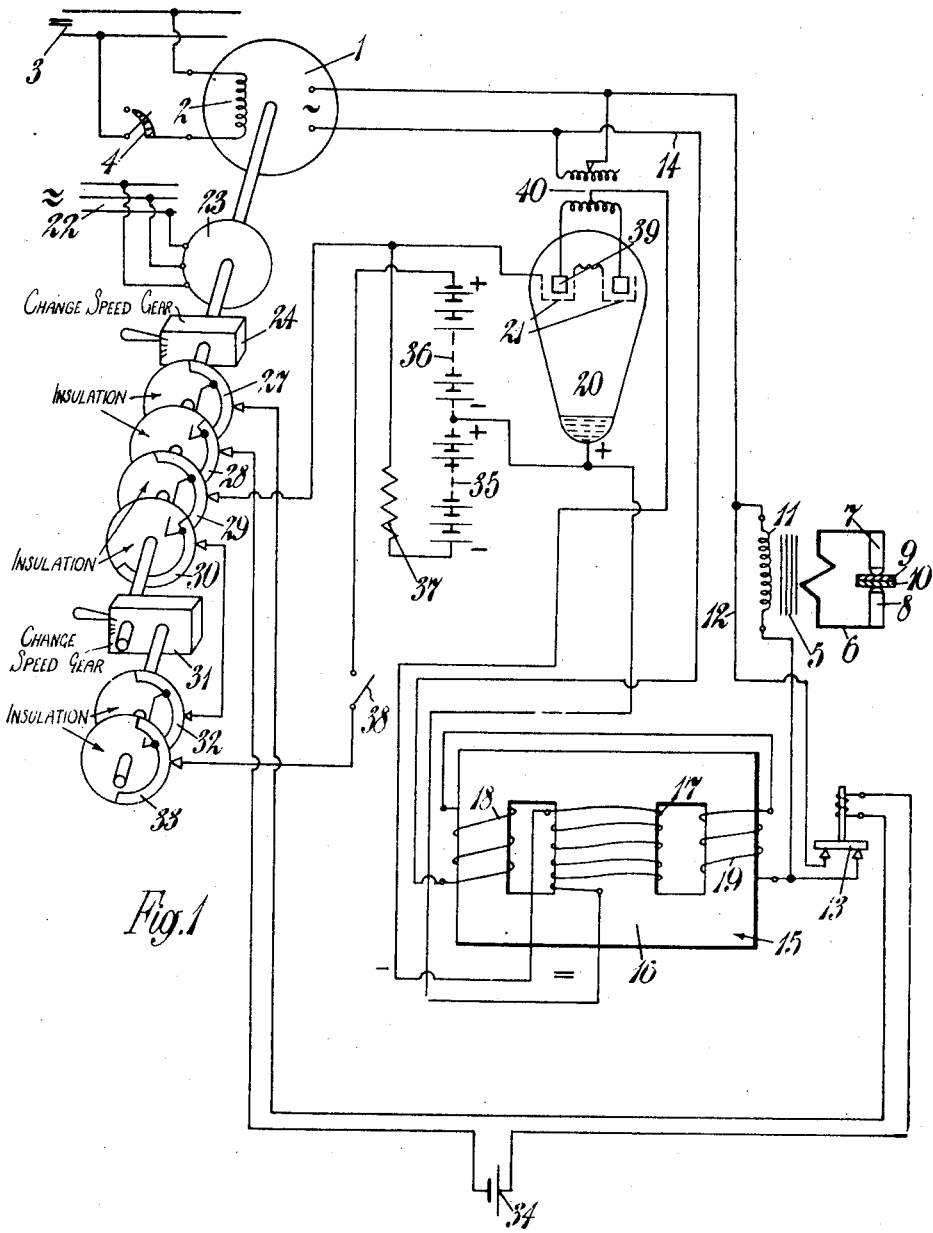

March 14, 1944.  G. HAGEDORN  2,344,353
CONTROL SYSTEM FOR RESISTANCE WELDING
Filed June 22, 1938    3 Sheets-Sheet 1

March 14, 1944.  G. HAGEDORN  2,344,353
CONTROL SYSTEM FOR RESISTANCE WELDING
Filed June 22, 1938  3 Sheets-Sheet 3

G. Hagedorn
Inventor

Patented Mar. 14, 1944

2,344,353

UNITED STATES PATENT OFFICE 2,344,353

CONTROL SYSTEM FOR RESISTANCE WELDING

Gerhard Hagedorn, Berlin-Halensee, Germany; vested in the Alien Property Custodian Application June 22, 1938, Serial No. 215,248
In Germany June 30, 1937

1 Claim. (Cl. 250—27)

The invention relates to an electric welding control system and it consists in that it comprises: a choking coil with iron core inserted in the primary circuit of the welding transformer and provided with an alternating current winding and a direct current winding; a source of direct current connected to the direct current winding and a switch in the circuit of direct current for switching on the current during short periods of time. The direct current is controlled as regards its intensity and duration by a current or voltage regulator and a time regulator. Preferably a short circuiting switch connected in parallel with the welding transformer, or a cut out connected in series with the welding transformer, is used for the purpose of reducing the current in the transformer to nil during the intervals of rest between the welding periods.

The welding transformer may be operated by an alternating current of 50 or 60 cycles. However, it is an advantage to supply a current of middle or high frequency to the transformer, more particularly an alternating current of, for instance 300 to 20,000 cycles.

The apparatus includes a source of welding current, a welding transformer for resistance welding connected to the source, a pre-magnetised choking coil operated by direct current arranged in the primary circuit of the welding transformer and a source of direct current with a regulating device for the intensity of the current and the period of connection of the said direct current choke.

A further feature of the apparatus includes a short circuiting switch connected in parallel with the welding transformer or a cut out connected in series therewith. The source of welding current may consist of a generator driven by a motor, preferably a generator of middle or high frequency currents, and the driving motor may operate at the same time the switching means controlling the direct current for the control of the choking coils and switches.

The direct current side of the choking coil receives current, preferably from a rectifier, the grid of which is controlled by mechanical controlling means, such as switching cylinders mechanically coupled with the generator.

A further feature of the invention pertains to an arrangement wherein the mechanical control of the grids of the rectifier feeding the direct current side of the choking coils is replaced by a purely electric short period control arrangement by which a grid voltage, which is positive with respect to the cathode, is supplied for a selected period of time to the grids of the rectifier having two or more anodes. The positive gradually dropping grid voltage is produced by the discharge of a condenser, which discharge may be controlled by an auxiliary tube, the grid of which is controlled synchronously with the network feeding the rectifier. The discharge of the condenser may be effected by a hand-operated key.

In the case of seam-welding the key may be operated mechanically, so that any desired series of spots may be obtained. A synchronously-operating interrupter for producing the intervals of rest of the welding may be arranged in the grid circuit of the auxiliary tube.

The invention is illustrated diagrammatically and by way of example in the accompanying drawings and showing three different arrangements.

Figure 2:
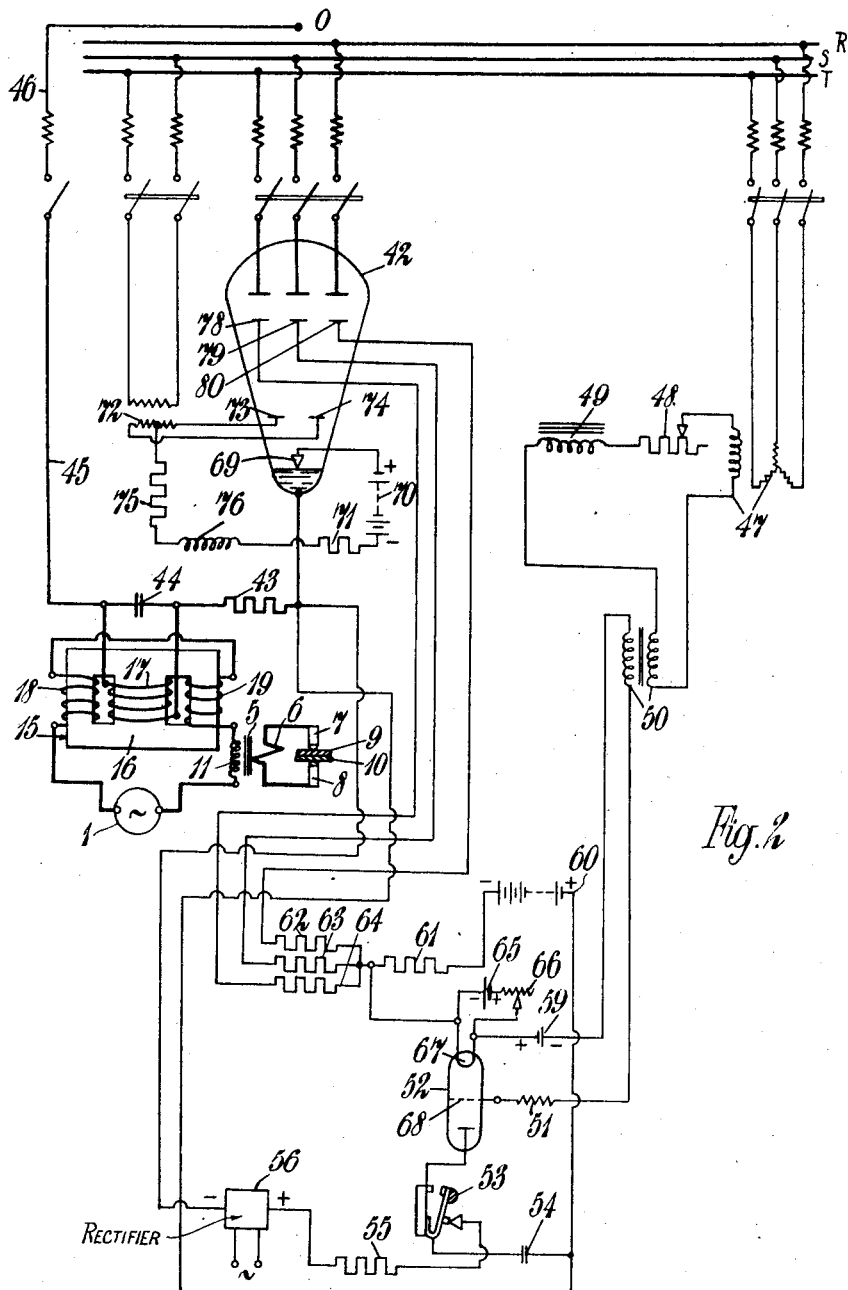
Figure 3:
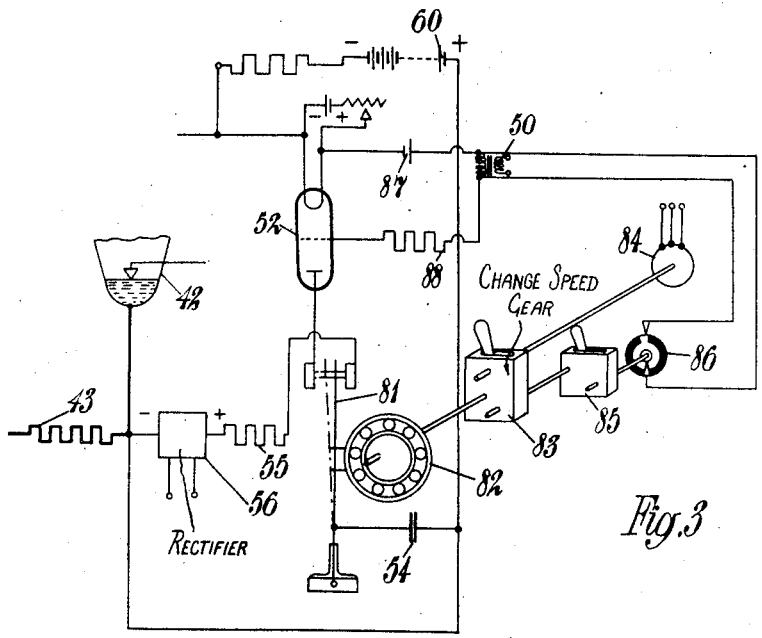
Figure 4:
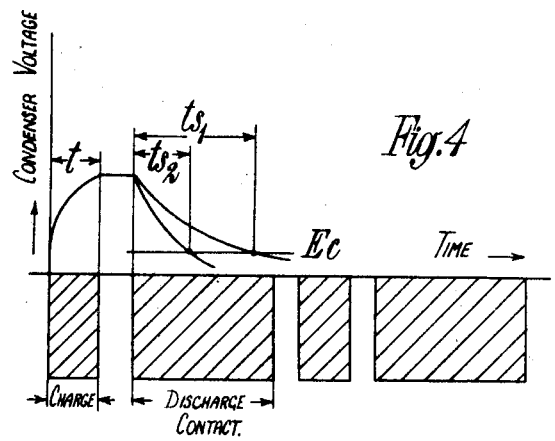

Fig. 1 is a diagram of connections of a resistance spot welding installation in which a choke switch pre-magnetised by a direct current is arranged in the primary circuit of the welding transformer, Fig. 2 is a diagram of connection of a resistance spot welding installation with a choke switch pre-magnetised by a direct current arranged in the primary circuit of the welding transformer, illustrating modified control means for the rectifier which supplies the direct current for the choke switch, Fig. 3 shows a portion of a diagram of connections in a resistance seam welding installation, and Fig. 4 shows the relationship between the grid voltage and the welding time and the position of the controlling contact in the case of seam welding.

Referring to Fig. 1, 1 is a welding generator, for instance of middle or high frequency currents, the field 2 of which is supplied with current from a direct current network 3, through a switch and regulator 4. The excitation current can be adjusted to the necessary requirements. The welding generator 1 is connected to the welding transformer 5, the secondary 6 of which is connected to the welding electrodes 7 and 8 between which there is placed the welding material, for instance two metal sheets 9 and 10 to be welded together. A circuit 12 connected in parallel with the primary coil 11 of the welding transformer contains a short circuiting switch 13. A choke 15 acting as a switch is inserted in the circuit 14 between the welding generator 1 and the welding transformer 5, which choke comprises, for instance, a three-limb magnetic core 16 and a direct current excitation winding 17. 18 and 19 are the coils intended to carry alternating current. The direct current winding 17 is energised by a current rectified by means of a mercury vapour rectifier, 20 which receives current, for instance, from the alternating current generator 1. The rectifier is controlled by the grid 21.

The generator 1 is driven by a motor 23 energised from the three-phase network 22, which motor also drives through a change speed gear 24, the controllers 27, 28, 29 and 30, and through a further change speed gear 31, the controllers 32 and 33.

The controllers 27 and 28 are connected through a source of current 34 to the electromagnetically operated short circuiting switch 13. The choking coil may be made small if high inductance, when no direct current is flowing, is not required. On the other hand, the minimum value of the alternating current increases with decreased inductance. Therefore it is an advantage to short circuit the transformer or disconnect it by means of a switch during the periods when no actual welding takes place. The switch which has to deal only with a small output. Instead of the short circuiting switch use may be made of a cut out which is opened in the intervals during which no welding takes place. The controllers 29, 30, 32, 33 operate one of the known grid control arrangements consisting of a source of direct current voltage 36 for the positive, a source of direct current voltage 35 for the negative grid voltage and a resistance 37. Moreover a switch 38 may be used to stop the operation of the apparatus. 39 are the two anodes of the rectifier. The connection with the generator 1 is effected, for instance, through a step transformer 40. In addition to the regulation being effected through the step transformer the voltage may also be regulated by suitably choosing the ignition angle for the grids 21.

The controllers 29 and 30 may be used for adjusting the time of welding, for instance, by displacing the one controller 30. Further, the adjustment may be effected by varying the speed, by means of the change speed gear 24. The controllers 27—28, which are constructed and arranged in the same way as the controllers 29—30, disconnect the switch 13 during the welding periods, whereby the short circuit of the transformer is removed. The controllers 32, 33 adjust the periods during which there is no actual welding. If the number of revolutions of 32, 33 is half that of 27, 28, then one welding period is left out. If it is one-third thereof, then two periods are left out, and so on. The greater the ratio of transmission of the change speed gear, the greater is the interval between the individual welding spots. With increasing transmission ratio the segment covering of the controllers 32, 33 must be made so small that the period of closure coincides with the period of welding.

In this way, welding periods below 1/100 of a second can be obtained, so that this method is useful, also for the welding of light metal.

A further advantage of the control system consists in that the intensity of the welding current can also be easily varied, for instance, in the example shown in Fig. 1, by regulating the direct current voltage of the rectifier by means of the grids.

Since the output to be dealt with is small, any desired switches may be used, for instance, relays, cam switches, controllers, etc. Use may also be made, for energising the direct current coil, of a separate small direct current generator, the excitation of which is controlled.

The apparatus described is especially suitable for high frequency welding installations, since the magnetic flux of the choke and, therefore, the choke itself, are small. In the case of high frequency currents therefore it is possible to obtain very short periods of welding. Also the direct current output for the magnetising coil is reduced, which results again in a reduction in the size of the whole of the direct current circuit.

Referring to Fig. 2, the source of alternating current supplying the welding current, for instance an alternating current generator 1, is connected to the primary coil 11 of the welding transformer through the choke 15, which is premagnetised by direct current, the said choke being, for instance, provided with a three-limb magnetic core 16 and alternating current coils 18 and 19. The choke 15 is also provided with a direct current excitation winding 17. The welding transformer is provided with an iron core 5 and a secondary coil 6, which is connected to the two welding electrodes 7 and 8 arranged to spot weld the metal sheets 9 and 10.

The rectifier 42, provided with controlling grids 78, 79 and 80 supplied with current from a three-phase network 41 through resistances and switches, supplies current over a resistance 43 to the direct current winding 17 of the choke 15, the ends of which winding are connected to a condenser 44. A conductor 45 leads through a switch and resistance 46 to the star point of the network.

The three-phase network 41 supplies current to the grid transformer 50, through resistances and switches, through a phase shifter and an adjustable resistance 48 and a highly saturated choking coil 49 which grid transformer supplies to the grid 68 the voltage for the path of the gas or vapour discharge path, for instance of an incandescent cathode tube 52, through a resistance 51. When the contact key 53 is in the position illustrated in the drawings, it connects the condenser 54, which supplies the positive grid voltage for the rectifier 42, to the positive pole of an auxiliary rectifier 56 through a resistance 55. When the key 53 is operated, the condenser 54 is discharged through the tube 52, so that a positive grid voltage is imparted to the rectifier 42, whereby the direct current of the choke 15 is switched on.

59 and 60 are batteries which supply the negative grid voltage biases. 61, 62, 63 and 64 are resistances. The battery 65 supplies the heating current for the cathode 67 of the grid controlled auxiliary tube 52 through an adjustable resistance 66.

The starting anode 69 of the rectifier 42 is supplied with current, for instance from a starting battery 70, through a resistance 71. Further, an auxiliary transformer 72 receives current from the three-phase network 41 through resistances and switches, which transformer in its turn supplies current to two continuously working auxiliary electrodes 73 and 74 of the rectifier 42. 75 is a resistance and 76 a choking coil.

The following is to be pointed with respect to the operation of the improved apparatus:

A voltage which during the selected period of welding drops from a value which is positive with respect to the cathode down to a stopping value is supplied to the grids 78, 79, 80 of the rectifier 42 by the discharge of an energy accumulator, for instance a condenser 54.

By using the choke 15 supplied with current from the rectifier 42, the great advantage is attained that the rectifying apparatus is very small and that, therefore, a switching device according to this invention is useful, even for transportable welding plants.

The switching may consist in charging a condenser and discharging it through resistances, grids and cathodes. In this very simple form the principle is suitable only when the welding is of long duration, since the latter depends on the moment of switching on. In the case of three-phase rectifiers and 50 cycles the difference may, for instance, reach 6.6/1000 seconds. It is possible to use the arrangement also for welding of short periods, by discharging the condenser through an auxiliary gas or vapour path of discharge, for instance the tube 52. When the key 53 is in the position of rest, the condenser 54 is charged by a source of direct current 56. When the key is pressed down, the condenser 54 is discharged through the tube 52, and through the current path leading to the cathode, but only from the moment when, by means of the grid transformer 50, the stop potential of the battery 59 is rendered ineffective. The grid transformer 50 is fed from the network 41 feeding the rectifier, through a phase shifter 47 and a highly saturated choking coil 49. The phase shifter causes the starting to take place always at the same moment with respect to the alternating current voltage, and thus the same anode of the rectifier always to start with the same angle of phase. The saturated choke acts in the known manner. The secondary voltage of the grid transformer is greatly distorted and becomes very pointed, so that sharp points of intersection with the starting characteristic curve of the auxiliary tube 52 are obtained.

The adjustment of the time of welding is best effected by properly choosing the size of the condenser. In the case of welding times below half a wave, the starting and therefore the period of welding can be adjusted by means of the phase shifter.

By means of the new switching apparatus, the switching of the time can be carried out exactly and regularly. Moreover a very quick series of spot welds can be obtained, since, after the key has been released, the plant is again quickly ready for operation since the charging of the condenser takes only a very short time. Apart from the key one does not require any parts which are movable or subject to wear. By driving the key mechanically, the apparatus may be rendered useful for seam welding.

Fig. 3 shows the modification of the arrangement according to Fig. 2 for electrical seam welding. The rectifier 42 feeds the choke, which is not shown, through the resistance 43. The condenser 54 and the parts 55 and 56 are the same as in Fig. 2, but the hand key 53 shown in Fig. 2 is replaced by a swinging lever 81, which is driven mechanically by an eccentric, for instance an eccentrically mounted ball bearing 82, over a change speed gear 83 operated, for instance, by a two pole synchronous motor 84. With each step of the change speed gear one obtains a certain range of welding period. A contact roller 86 is rotated by a further drive, which contact roller closes and interrupts the grid circuit of the auxiliary tube 52 through the battery 87 and the resistance 88. The same serves for the introduction of periods of rest for the welding, as is required in the case of stitch welding. If the gear ratio is 1:3 for instance, then the contact is opened only once, when the ignition reaches its apex, but the auxiliary tube 52 is not ignited twice, since the ignition (starting) transformer is short circuited.

Fig. 4 shows how, in the closed time of the charging contact, the charging time $t$ of the condenser 54 and, in the closed time of the discharge contact, the welding time $ts$ determined by the size of the condenser, are distributed. As soon as the condenser voltage reaches a definite value $E_c$, the negative voltage bias of the battery 60 is preponderant and the rectifier works after the corresponding alternating current wave is terminated.

What I claim is:

In a control system for resistance welding wherein the welding electrodes are supplied with alternating current through a reactance coil adapted to be influenced by direct current, a source of alternating current of a given frequency, a rectifier tube having a cathode, a plate-cathode circuit for said tube controlling the passage of rectified current from said alternating current source through the reactance coil, a grid for said tube, a direct current source permanently biasing said grid negatively with respect to said cathode, an auxiliary tube rendered conductive in synchronism with the frequency of said alternating current source, a condenser, a second source of direct current, a manually operable switch normally connecting the condenser to the second direct current source to charge the condenser, a circuit connected to said switch and said auxiliary tube adapted to be closed upon manual operation of said switch so that the condenser may discharge through the auxiliary tube in synchronism with the frequency of said alternating current source, and means for biasing said grid positively upon discharge through the auxiliary tube.

GERHARD HAGEDORN.